US011110481B2

(12) United States Patent
Ikushima

(10) Patent No.: US 11,110,481 B2
(45) Date of Patent: Sep. 7, 2021

(54) LIQUID MATERIAL DISCHARGE DEVICE, AND APPLICATION DEVICE AND APPLICATION METHOD THEREFOR

(71) Applicant: MUSASHI ENGINEERING, INC., Mitaka (JP)

(72) Inventor: Kazumasa Ikushima, Tokyo (JP)

(73) Assignee: MUSASHI ENGINEERING, INC., Tokyo (JP)

(*) Notice: Subject to any disclaimer, the term of this patent is extended or adjusted under 35 U.S.C. 154(b) by 366 days.

(21) Appl. No.: 16/304,819

(22) PCT Filed: May 25, 2017

(86) PCT No.: PCT/JP2017/019506
§ 371 (c)(1),
(2) Date: Nov. 27, 2018

(87) PCT Pub. No.: WO2017/208958
PCT Pub. Date: Dec. 7, 2017

(65) Prior Publication Data
US 2020/0316637 A1    Oct. 8, 2020

(30) Foreign Application Priority Data

May 31, 2016  (JP) .............................. JP2016-109208

(51) Int. Cl.
*B05C 5/02*  (2006.01)
*B05C 11/10*  (2006.01)
(Continued)

(52) U.S. Cl.
CPC ............ *B05C 5/02* (2013.01); *B05C 5/00* (2013.01); *B05C 5/0225* (2013.01); *B05C 11/10* (2013.01); *B05D 1/26* (2013.01); *F16K 1/42* (2013.01)

(58) Field of Classification Search
CPC ....... B05C 5/02; B05C 11/10; B05C 11/1034; B05C 11/1026; B05C 5/0208; B05C 5/00;
(Continued)

(56) References Cited

U.S. PATENT DOCUMENTS 4,931,679 A    6/1990 Fournier
5,156,188 A *  10/1992 Wakita ...................... F16K 1/36
                                                    137/625.3
(Continued)

FOREIGN PATENT DOCUMENTS

CN    101743423 A    6/2010
CN    102006943 A    4/2011
(Continued)

OTHER PUBLICATIONS

Office Action dated Jun. 24, 2020, issued in counterpart CN Application No. 201780033958.2, with English Translation. (13 pages).
(Continued)

*Primary Examiner* — Laura Edwards
(74) *Attorney, Agent, or Firm* — Westerman, Hattori, Daniels & Adrian, LLP

(57) ABSTRACT

A liquid material discharge device and method capable of remedying the problem of liquid leakage caused by a closing failure that may occur in a negative pressure environment. The liquid material discharge device is used in a negative pressure space, and includes a storage container, a compressed-gas supply source pressurizing the storage container, a nozzle having a discharge flow path, a reciprocating valve rod, an actuator driving the valve rod, a valve seat having a communication hole that is communicated with the discharge flow path, and a discharge control device controlling the actuator to open and close the communication hole by a tip of the valve rod. The device can further include a (Continued)

resin film disposed at a lower end of the valve rod, or a resin film disposed on an upper surface of the valve seat and having a through-hole communicating with the communication hole.

17 Claims, 9 Drawing Sheets

(51) Int. Cl.
*B05D 1/26* (2006.01)
*B05C 5/00* (2006.01)
*F16K 1/42* (2006.01)

(58) Field of Classification Search
CPC ... B05C 5/0225; B05C 5/0258; B05B 1/3046; B65D 47/248; B65D 83/262; B67D 47/248; B67D 3/0003; F16K 1/36; F16K 1/42; F16K 31/02; B05D 1/26
USPC .......................... 118/50, 300; 222/504, 518
See application file for complete search history.

(56) References Cited

U.S. PATENT DOCUMENTS

| | | |
|---|---|---|
| 5,875,922 A | 3/1999 | Chastine et al. |
| 6,060,125 A | 5/2000 | Fujii |
| 6,361,491 B1 | 3/2002 | Hasegawa et al. |
| 6,558,127 B2 | 5/2003 | Maruyama et al. |
| 6,565,333 B2 | 5/2003 | Maruyama |
| 6,679,685 B2 | 1/2004 | Maruyama et al. |
| 7,134,617 B2 | 11/2006 | Ikushima |
| 7,762,088 B2 | 7/2010 | Fiske et al. |
| 8,074,467 B2 | 12/2011 | Fiske et al. |
| 8,181,468 B2 | 5/2012 | Fiske et al. |
| 8,448,818 B2 | 5/2013 | Ikushima |
| 8,578,729 B2 | 11/2013 | Fiske et al. |
| 8,757,449 B2 | 6/2014 | Ikushima |
| 8,807,400 B2 | 8/2014 | Ikushima |
| 9,162,249 B2 | 10/2015 | Koyama et al. |
| 9,540,225 B2 | 1/2017 | Ikushima |
| 9,889,463 B2 | 2/2018 | Ikushima |
| 2001/0043864 A1 | 11/2001 | Maruyama et al. |
| 2002/0025260 A1 | 2/2002 | Maruyama |
| 2003/0012667 A1 | 1/2003 | Maruyama et al. |
| 2004/0134996 A1 | 7/2004 | Kazumasa |
| 2006/0157517 A1 | 7/2006 | Fiske et al. |
| 2009/0001305 A1 | 1/2009 | Cook et al. |
| 2009/0212729 A1 | 8/2009 | Cook |
| 2010/0080912 A1 | 4/2010 | Koyama et al. |
| 2010/0252576 A1 | 10/2010 | Fiske et al. |
| 2011/0114673 A1 | 5/2011 | Fiske et al. |
| 2012/0205392 A1 | 8/2012 | Fiske et al. |
| 2012/0217262 A1 | 8/2012 | Ikushima |
| 2014/0374637 A1 | 12/2014 | Nakamura et al. |
| 2015/0014362 A1 | 1/2015 | Ikushima |
| 2015/0048120 A1 | 2/2015 | Ikushima |
| 2016/0236228 A1 | 8/2016 | Ikushima |

FOREIGN PATENT DOCUMENTS

| | | |
|---|---|---|
| CN | 104011444 A | 8/2014 |
| CN | 104668152 A | 6/2015 |
| JP | H01-303709 A | 12/1989 |
| JP | H02-86670 U | 7/1990 |
| JP | H10-151393 A | 6/1998 |
| JP | H11-188288 A | 7/1999 |
| JP | H11-197571 A | 7/1999 |
| JP | 2000-292713 A | 10/2000 |
| JP | 2000-317369 A | 11/2000 |
| JP | 2001-113212 A | 4/2001 |
| JP | 2001-246298 A | 9/2001 |
| JP | 2002-021715 A | 1/2002 |
| JP | 2002-282740 A | 10/2002 |
| JP | 2002-326715 A | 11/2002 |
| JP | 2005-211874 A | 8/2005 |
| JP | 2006-281178 A | 10/2006 |
| JP | 2007-111862 A | 5/2007 |
| JP | 2007-530249 A | 11/2007 |
| JP | 2009-219993 A | 10/2009 |
| JP | 2010-87320 A | 4/2010 |
| JP | 2013-192972 A | 9/2013 |
| JP | 2013-208613 A | 10/2013 |
| KR | 10-2014-0006135 A | 1/2014 |
| WO | 2008/126373 A1 | 10/2008 |
| WO | 2011/037139 A1 | 3/2011 |
| WO | 2013/118669 A1 | 8/2013 |
| WO | 2015/046481 A1 | 4/2015 |

OTHER PUBLICATIONS

International Search Report dated Aug. 29, 2017, issued in counterpart application No. PCT/JP2017/019506. (3 pages).
International Preliminary Report on Patentability (Form PCT/IPEA/409) issued in counterpart International Application No. PCT/JP2017/019506 dated May 25, 2017. (16 pages).
Office Action dated Apr. 20, 2021, issued in counterpart KR application No. 10-2018-7033557, with English translation (11 pages).

* cited by examiner

LIQUID MATERIAL DISCHARGE DEVICE, AND APPLICATION DEVICE AND APPLICATION METHOD THEREFOR

TECHNICAL FIELD

The present invention relates to a device and a method for discharging a liquid material in a negative pressure environment. In this Description, it is assumed that the term "negative pressure environment" includes a vacuum environment.

BACKGROUND ART

If bubbles are present in a liquid resin (liquid material) in a step (such as potting or underfilling) of applying the liquid material to a substrate to which a semiconductor component and so on are mounted, various adverse influences occur; for example, a discharge amount varies, a shape and a position of the applied liquid material are not constant (namely, drawing lines become disordered), the liquid material is scattered because the bubbles are ejected at the same time as when the liquid material is discharged, and the extra liquid material adheres to the surroundings of a discharge port of a nozzle.

As one example of methods for removing the above-mentioned adverse influences of the bubbles, there is known a method of placing the liquid material in a vacuum environment for degassing. According to the most general degassing method, prior to starting work, a container (syringe) containing the liquid material and actually used in the work is put as it is into another enclosed container, and the enclosed container is evacuated into a vacuum state for degassing of the liquid material. As for another method, there is proposed an application device having an inner space in which application of the liquid material is performed, the inner space being formed as an enclosed space and evacuated into a vacuum state for degassing of the liquid material.

For example, Patent Document 1 discloses a liquid material application device including a storage-discharge unit that stores a liquid material and discharges the liquid material through a discharge port, and applying the liquid material to an application target, wherein the application device further includes an application space surrounding at least the storage-discharge unit and the application target, and an evacuation system evacuating the application space into a negative pressure state, and wherein the liquid material is discharged toward the application target from the storage-discharge unit while the application space is held in the negative pressure state.

Patent Document 2 discloses a vacuum application device including a vacuum chamber in which a target product for application of a liquid resin is disposed, and applying the liquid resin in a vacuum state to a predetermined position of the application target product from a dispenser that is a supply source of the liquid resin, wherein the vacuum chamber containing the application target product is constituted by a first container portion containing and supporting the application target product, and a second container portion to which a nozzle of the dispenser is attached, wherein the first container portion and the second container portion are constituted to be relatively movable in an X-Y plane without breaking an airtight state of the vacuum chamber, and wherein an X-Y driver moving at least one of the first and second container portions in the X-Y plane and causing a relative planar positional relation between the application target product and the nozzle to be variable is installed outside the vacuum chamber.

CITATION LIST

Patent Documents

Patent Document 1: Japanese Patent Laid-Open Publication No. 2005-211874
Patent Document 2: Japanese Patent Laid-Open Publication No. 2007-111862

SUMMARY OF INVENTION

Technical Problem

In the case of performing application work using a discharge device arranged in a negative pressure space, because negative pressure force always acts on a discharge port of the discharge device, the so-called needle-type closing mechanism for opening and closing the discharge port by making a valve member (valve rod) contacted with or departed from a valve seat having an opening, which is communicated with the discharge port, is adopted to realize accurate discharge.

In the needle-type closing mechanism, if machining accuracy (such as flatness and roundness) of contact portions of the valve member and the valve seat is low, or if wear occurs due to long-time use, a problem arises in that a liquid flows out from the discharge port even in a closed state. Particularly, when the valve member and the valve seat are both made of metal, liquid leakage from the discharge port becomes a serious problem for the reason that deformation amounts of the valve member and the valve seat when brought into the closed state are relatively small, and that the valve member and the valve seat come into a non-contact state in some regions.

An object of the present invention is to provide a liquid material discharge device and method capable of remedying the problem of liquid leakage caused by a closing failure that may occur when the discharge device is disposed in a negative pressure environment.

Solution to Problem

Using an elastic material (e.g., rubber) to form the valve seat is conceivable with intent to enhance closing performance (sealing performance) in a seated state of the valve member. However, it has been found that, because the valve seat made of the elastic material is excessively deformed upon the valve rod striking against the valve seat, the valve seat is deformed to such an extent as coming into the discharge flow path, thus causing the following problems. When the valve rod is lowered, a liquid is excessively discharged in an amount corresponding to the deformation of the valve seat, and when the valve rod is raised, discharge of the liquid is delayed due to the necessity of compensating for return from the deformation with advance of the liquid. The above-described excessive discharge of the liquid and delay in discharge of the liquid may deteriorate discharge accuracy.

It has also been found that the occurrence of deformation (mainly expansion), stress, and strain of the valve seat due to heat further affects the discharge accuracy.

From experiments of forming a valve seat member, which constitutes the valve seat, using plastic harder than rubber, it has been confirmed that closing performance in the seated state of the valve seat is not sufficient, and that the liquid leaks from the discharge port. The above result is presumably attributable to the reason that, when a thickness of the valve seat member is relatively large in an acting direction of force applied from the valve rod, the valve seat member is hard to deform and the closing performance is reduced. On the other hand, when pressing force applied from the valve rod is increased, a deformation amount of the valve seat member is increased, and this increase of the deformation amount is estimated to cause not only similar problems to those described in the above case of the valve seat member being made of rubber, but also shortening of lifetimes of the valve rod and the valve seat member.

Through a trial and error process, the inventor has reached an idea of using a resin film to enhance the closing performance with a minimum deformation amount, and has accomplished the present invention. In other words, the present invention is constituted by the following technical features.

The present invention provides a liquid material discharge device used in a negative pressure space, the liquid material discharge device comprising a storage container storing a liquid material, a compressed-gas supply source pressurizing the storage container, a nozzle having a discharge flow path, a reciprocating valve rod, an actuator driving the valve rod, a valve seat having a communication hole that is communicated with the discharge flow path, and a discharge control device controlling the actuator to open and close the communication hole by a lower end of the valve rod, wherein the liquid material discharge device further comprises a resin film disposed at the lower end of the valve rod or a resin film disposed on an upper surface of the valve seat, the latter resin film having a through-hole that is communicated with the communication hole.

In the above liquid material discharge device, the resin film may be made of resin having a lower elastic modulus than the lower end of the valve rod and the valve seat.

In the above liquid material discharge device, the resin film may have a thickness of 10 to 1,000 μm.

In the above liquid material discharge device, the lower end of the valve rod or the upper surface of the valve seat may come into plane contact with the resin film. In this case, preferably, the lower end of the valve rod is flat, and the upper surface of the valve seat is flat.

In the above liquid material discharge device, tensile strength of the resin film may be not less than 50 MPa. In this case, preferably, the resin film is made of engineering plastic, and/or the lower end of the valve rod and the valve seat are each made of metal.

In the above liquid material discharge device, the valve seat may be constituted by a valve seat member that is mechanically fixed.

In the above liquid material discharge device, the discharge control device may control an acceleration time $A_u$ in rising of the valve rod by the actuator to be held within a range of 2 to 300 [ms], thus preventing generation of bubbles caused with the rising of the valve rod. In this case, preferably, the discharge control device controls a target speed $V_1$ in the rising of the valve rod by the actuator to be held within a range of 0.2 to 30 [mm/s], and/or controls an acceleration time $A_d$ in lowering of the valve rod by the actuator to be held within a range of 2 to 300 [ms].

In the above liquid material discharge device, the discharge control device controls the acceleration time $A_u$ in the rising of the valve rod and the acceleration time $A_d$ in the lowering of the valve rod by the actuator to be the same.

In the above liquid material discharge device, the actuator may be driven by using, as a drive source, a motor capable of controlling an advanced position of the valve rod with the discharge control device. In this case, preferably, the actuator is driven by using, as the drive source, one selected from among a stepping motor, a servomotor, and a linear motor.

The above liquid material discharge device may further comprise a position detection mechanism detecting that the lower end of the valve rod is at a position closing the valve seat. In this case, preferably, the position detection mechanism comprises a slide member connected to the actuator, a slider connected to the slide member, a sensor mechanism detecting that the slide member is at a predetermined position, a rod conjunction member connected to the valve rod and arranged in contact with the slide member in a separable manner, and an elastic member applying biasing force to keep the rod conjunction member and the slide member contacted with each other in a separable manner, wherein, when force acting to further advance the valve rod is applied by the actuator after the valve rod has come into contact with the valve seat, the slide member is moved downward away from the rod conjunction member, and the lower end of the valve rod being at the position closing the valve seat is detected by detecting the downward movement of the slide member with the sensor mechanism.

The present invention further provides an application device comprising the above-described liquid material discharge device, a worktable on which a workpiece is to be placed, a relative driving device moving the liquid material discharge device and the worktable relatively to each other, a cover constituting a negative pressure space in which the liquid material discharge device, the worktable, and the relative driving device are arranged, a depressurization device producing negative pressure inside the cover, and a drive control device controlling the relative driving device.

In the above application device, the depressurization device may be a vacuum pump.

The present invention still further provides an application method using the above-described application device, wherein the liquid material is applied onto the workpiece while the workpiece and the liquid material discharge device are moved relatively to each other in a state that an inner space of the cover is held under negative pressure by the depressurization device.

In the above application method, the inner space of the cover may be substantially under a vacuum.

Advantageous Effects of Invention

According to the present invention, the problem of liquid leakage from a discharge port in a valve-closed state in a negative pressure environment can be solved because the valve rod contacts the valve seat with the resin film interposed therebetween.

Furthermore, an adverse influences on the discharge accuracy can be minimized because, in the valve-closed state, substantially only the resin film is deformed to enhance the closing performance.

DESCRIPTION OF EMBODIMENTS

Figure 1:
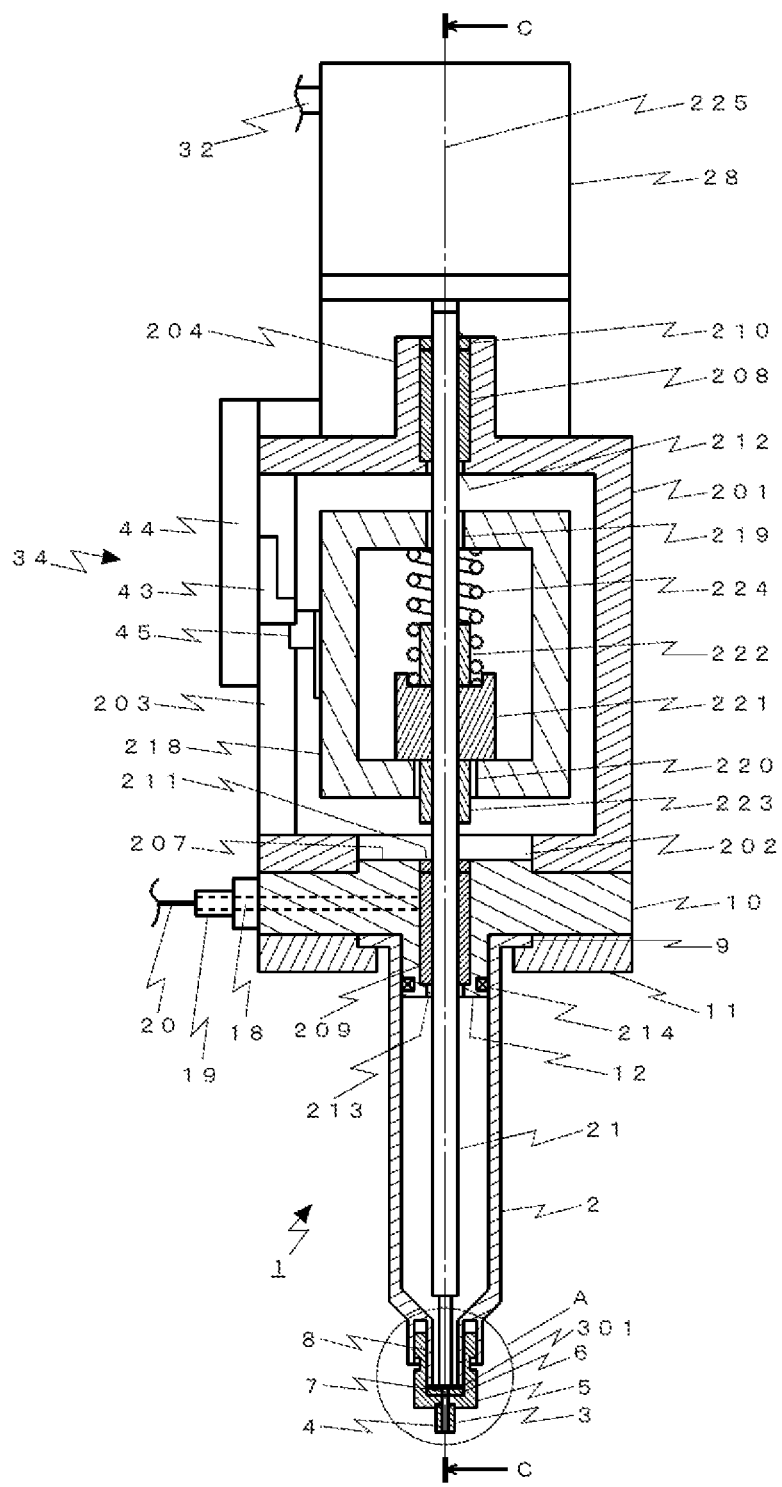
FIG. 1 is a partial sectional front view of a discharge device according to a first embodiment.

Embodiments for carrying out the present invention will be described below.

First Embodiment

A discharge device 1 according to a first embodiment of the present invention is a discharge device of the type that a liquid material is discharged by opening a communication hole 7 in a valve seat member 6 and a through-hole 302 in a resin film 301 with an operation of raising a valve rod 21, and that discharge of the liquid material is stopped by closing the communication hole 7 and the through-hole 302 with an operation of lowering the valve rod 21. The discharge device 1 is used in a negative pressure space in a state mounted to an application device 101. The discharge device 1 can prevent generation of bubbles by controlling an operation of an electric actuator 28 with a discharge control device 33, thereby adjusting a speed and an acceleration of the valve rod 21. The discharge device 1 includes a position detection mechanism 34 for detecting a position where the valve rod 21 comes into contact with the resin film 301. Thus, the communication hole 7 in the valve seat member 6 and the through-hole 302 in the resin film 301 can be reliably closed even when wear of the valve rod 21 or the valve seat member 6 occurs.

In the following, a structure of the discharge device 1 is first described, and an operation of the discharge device 1 is then described.

<Structure>

Figure 2:
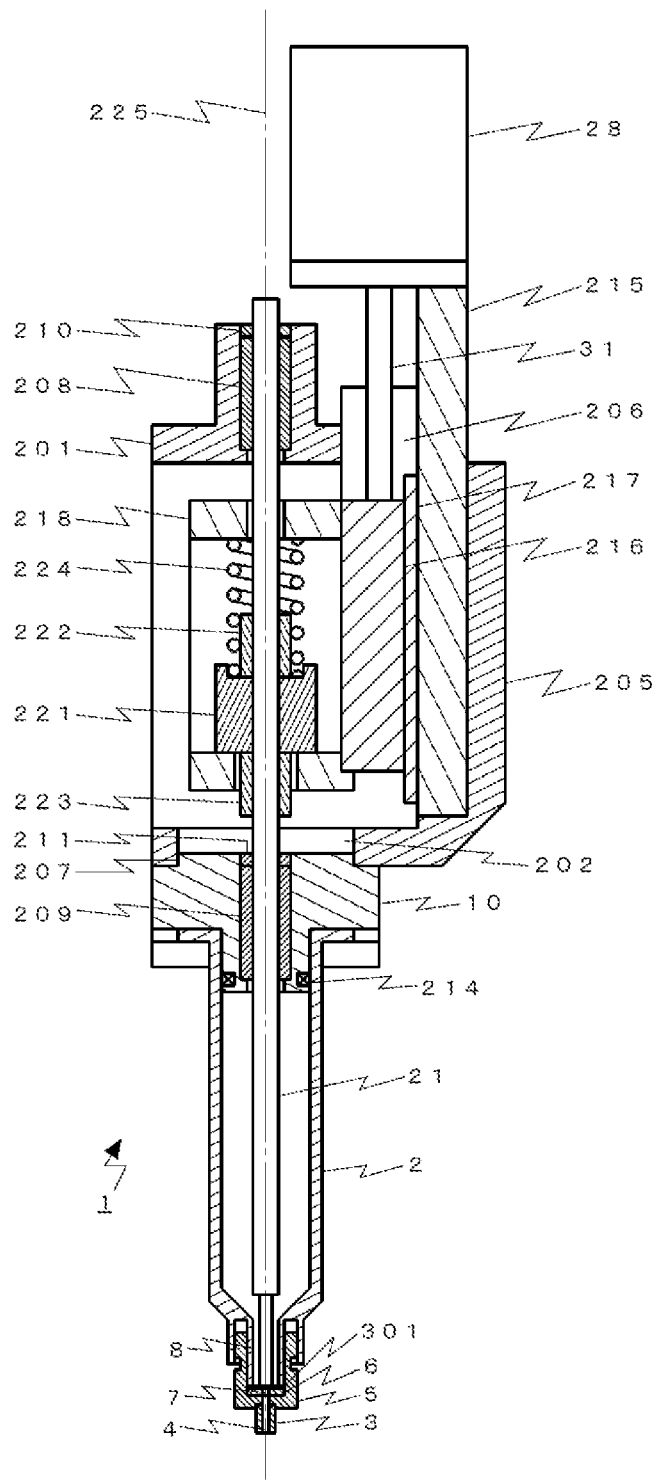
FIG. 2 is a sectional view taken along a line C-C in FIG. 1 when viewed in a direction denoted by arrow.
Figure 3:
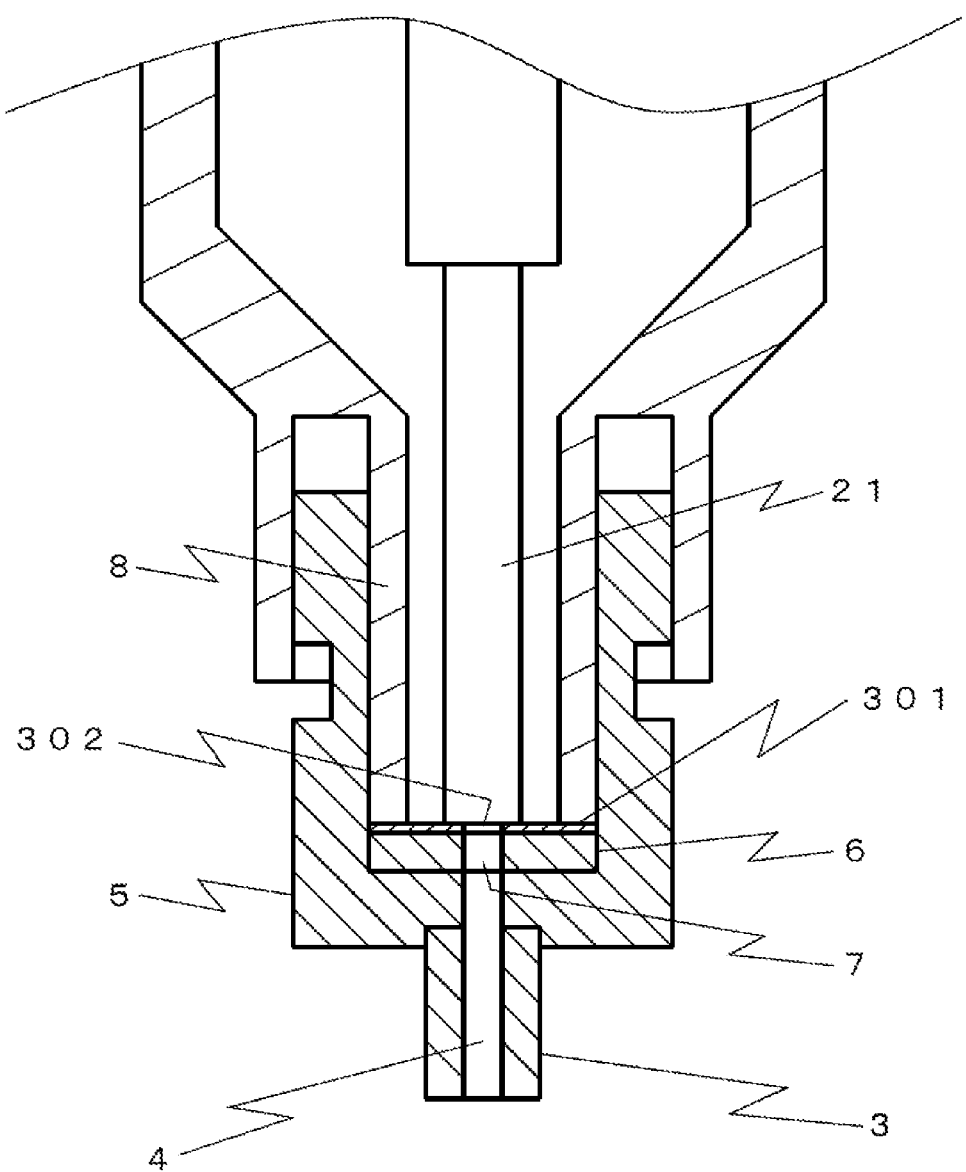
FIG. 3 is an enlarged view of a region A in FIG. 1.

FIG. 1 is a partial sectional front view of the discharge device according to a first embodiment. FIG. 2 is a sectional view taken along a line C-C in FIG. 1 when viewed in a direction denoted by arrow. FIG. 3 is an enlarged view of a region A in FIG. 1. In the following description, The actuator side (right side) in FIG. 2 is called a "rear side", the side (left side) opposite to the actuator side relative to a central axis is called a "front side", and right and left surfaces positioned between a rear surface and a front surface are called "lateral surfaces" in some cases.

The discharge device 1 includes a storage container (syringe) 2, a nozzle 3, a nozzle attachment member 5, the valve seat member 6, the resin film 301, a body lower member 10, the position detection mechanism 34, and the resin film 301.

The storage container 2 used in the first embodiment is a general resin-made syringe having a flange 9 at an upper end and an inner tube 8 at a lower end. However, a syringe made of metal (e.g., stainless steel) may be used instead. The valve rod 21 is inserted through the storage container 2, and an inner space of the inner tube 8 defines a rod-tip insertion hole. The nozzle attachment member 5, the valve seat member 6, the resin film 301, and the nozzle 3 are attached to the inner tube 8.

The nozzle 3 is a pipe-like member, and an inner space of the nozzle 3 defines a discharge flow path 4. The nozzle attachment member 5 is screwed into the lower end of the syringe 2, whereby the syringe 2 and the discharge flow path 4 in the nozzle 3 are communicated with each other via the valve seat member 6 and the resin film 301.

The nozzle attachment member 5 is a cylindrical metal member, and it has, in a bottom portion, a through-hole into which the nozzle 3 is inserted.

The valve seat member 6 is a disk-shaped member having an upper surface that constitutes a valve seat. The valve seat member 6 is fitted to a recess in the nozzle attachment member 5, and is mechanically fixed in a state sandwiched between the nozzle attachment member 5 and the inner tube 8 at the lower end of the syringe 2. The valve seat member 6 has the communication hole 7 having a diameter $\phi$ of 0.05 to 0.3 mm, for example, and communicating the syringe 2 and the discharge flow path 4 in the nozzle 3 with each other. The valve seat member 6 is preferably made of a material, e.g., metal, which is substantially not deformed by pressing of the valve rod 21.

The resin film 301 is a disk-shaped film and is disposed between the valve seat member 6 and the valve rod 21. The resin film 301 is fixedly held in a state sandwiched between the valve seat member 6 and the inner tube 8 at the lower end of the syringe 2. Details of the resin film 301 will be described later.

The body lower member 10 is a plate-like member including an insertion portion 12 projecting downward, a projected portion 207 projecting upward, and a second bushing insertion hole 213 extending vertically. A gas supply joint 19 is connected to one lateral surface of the body lower member 10. A flange support member 11 having a hook-like shape is disposed at a lower surface of the body lower member 10, and it holds the flange 9 formed at the upper end of the syringe 2. The insertion portion 12 has a circular columnar shape having same diameter as an inner diameter of the syringe 2 and is fitted into the syringe 2.

A space above the body lower member 10 is preferably covered with a not-illustrated cover for ensuring safety, dust proofing, etc.

The valve rod 21 is a linear member having a length extending from a position near the valve seat member 6 to a position near the actuator 28, and is inserted through a first bushing 208, a second bushing 209, a rod conjunction member 221, a first fixing member 222, a second fixing member 223, and an elastic member 224. A lower end portion of the valve rod 21 has a smaller width (diameter) than the syringe inner tube 8, and a gap between an inner wall of the inner tube 8 and a lateral peripheral surface of the valve rod 21 is filled with the liquid material. The valve rod 21 in this embodiment is constituted by a step-formed rod having an upper portion in the form of a large-diameter columnar member and a lower portion in the form of a small-diameter circular columnar member. However, the valve rod 21 may be constituted by a rod-like member having the same diameter over its entire length. The valve rod 21 is preferably made of a material, e.g., metal, which is substantially not deformed by the valve rod 21 seating against the valve seat member 6 and the resin film 301.

The first bushing 208 and the second bushing 209 are tubular members for supporting the valve rod 21 while slidably contacting the outer peripheral surface of the valve rod 21, and they function as guide members to prevent wobbling of the valve rod 21. In other words, with guide of the first bushing 208 and the second bushing 209, straight-moving stability of the valve rod 21 is improved, and the contact position between the lower end of the valve rod 21 and the valve seat member 6 is prevented from displacing. Thus, respective centers of the tip of the valve rod 21, the communication hole 7 in the valve seat member 6, and the through-hole 302 in the resin film 301 are just aligned with one another, and the occurrence of liquid leakage is prevented.

The second bushing insertion hole 213 penetrates through a center of the body lower member 10 from an upper surface of the projected portion 207 to a lower surface of the insertion portion 12, the lower surface corresponding to a lower end of the second bushing insertion hole 213. A diameter of the second bushing insertion hole 213 is substantially equal to that of the second bushing 209, but a portion of the second bushing insertion hole 213 closer to its lower end has a diameter smaller than that of the second bushing 209 (and greater than that of the valve rod 21). A step formed by that portion supports the second bushing 209. A second bushing retainer 211 for fixedly holding the second bushing 209 is disposed at an upper end of the second bushing insertion hole 213.

A not-illustrated communication hole for communicating the inside of the syringe 2 and a compressed-gas flow path 18 with each other is formed in the insertion portion 12, and compressed gas is supplied into the syringe 2 through the communication hole. A sealing member 214 for preventing leakage of the compressed gas to the outside is disposed over an outer surface of the insertion portion 12 near its lower end.

An outer frame 201 having a substantially rectangular parallelepiped shape with an inner space is disposed above the body lower member 10, and it includes a later-described position detection mechanism 34.

A fitting hole 202 is formed in a lower portion of the outer frame 201, and the projected portion 207 projecting from an upper surface of the body lower member 10 is fixedly fitted to the fitting hole 202.

An extension portion 204 is provided on an upper surface of the outer frame 201, and the first bushing 208 for supporting the valve rod 21 in a linearly movable manner is disposed in the extension portion 204. A first bushing insertion hole 212 in communication with the inner space of the outer frame 201 is disposed in the extension portion 204. As with the above-described second bushing insertion hole 213, the first bushing insertion hole 212 is also constituted by a large-diameter portion and a small-diameter portion, and a step between the large-diameter portion and the small-diameter portion supports the first bushing 208. A first bushing retainer 210 for fixedly holding the first bushing 208 is disposed at an upper end of the first bushing insertion hole 212. An opening 206 through which an actuator rod 31 and an actuator support member 215 are to be inserted is formed in an upper portion of the outer frame 201 on the rear side of the extension portion 204.

One lateral surface of the outer frame 201 (left lateral surface in FIG. 1, but it may be a right lateral surface without being limited to the left lateral surface) is opened, and an attachment plate 44 is disposed to cover the opened lateral surface over a certain size while forming an opening 203. The sensor 43 is fixedly disposed on an inner surface of the attachment plate 44. The sensor 43 in the first embodiment is a photosensor, but another type of sensor, such as a fiber sensor, a photoelectric sensor, or a vicinity sensor (of high-frequency oscillation type or capacitance type), may also be used.

The outer frame 201 is nearly entirely opened on the front side, and work for maintenance and adjustment can be performed through a front-side opening (see FIG. 2).

A rear portion 205 of the outer frame 201 is projected up to a more rearward position than the body lower member 10 (see FIG. 2). The actuator support member 215 in the form of a plate is disposed on the front (inner) side of the rear portion 205. The actuator support member 215 extends from a position near a lower end of a slider 216 to a position above the extension portion 204, and supports the actuator 28 above the outer frame 201. The slider 216 capable of moving over a slide rail 217 is disposed on the front side of the actuator support member 215. The slider 216 is coupled to the actuator rod 31 and the inner frame 218.

For example, a stepping motor, a servomotor, or a linear motor can be used as the actuator 28. Using such a motor as the actuator 28 is to control a speed and an acceleration in operation of the valve rod 21 driven by the actuator 28. In this embodiment, the actuator 28 is constituted by a stepping motor equipped with a resolver, and the speed and the acceleration in operation of the valve rod 21 are controlled. A control wiring 32 for communication with the discharge control device 33, which controls operation of the actuator 28, is connected to an upper end portion of the actuator 28.

The inner frame 218 is one-size smaller than the outer frame 201, and has a substantially rectangular parallelepiped shape with an inner space. The inner frame 218 is coupled to the slider 216, and functions as a slide member moving together with the slider 216.

The inner frame 218 is nearly entirely opened on the front side similarly to the outer frame 201.

A first through-hole 219 is formed in an upper portion of the inner frame 218, and a second through-hole 220 is formed in a lower portion of the inner frame 218. The valve rod 21 extends to pass through both the through-holes (219, 220). A diameter of the first through-hole 219 is greater than that of the valve rod 21, thus allowing the valve rod 21 to vertically move through the first through-hole 219 in non-contact relation. The second fixing member 223 having a smaller diameter than the second through-hole 220 is inserted through the second through-hole 220.

The rod conjunction member 221 is arranged in the inner space of the inner frame 218, and the valve rod 21 is fixedly inserted through a through-hole in the rod conjunction member 221. When the slider 216 is moved vertically, the inner frame 218 coupled to the slider 216 is moved together, whereby the valve rod 21 is also moved vertically via the rod conjunction member 221.

The rod conjunction member 221 is fixed to the valve rod 21 in a state that the first fixing member 222 and the second fixing member 223 tightly sandwiches the rod conjunction member 221 from above and below. More specifically, threads are formed in the outer peripheral surface of the valve rod 21 in its portions to which the fixing members (222, 223) are attached, and those threads can be meshed with threads formed in inner peripheral surfaces of the fixing members (222, 223). Therefore, the rod conjunction member 221 can be fixed to a desired position by adjusting positions of the fixing members (222, 223). The position of the rod conjunction member 221 is preferably adjusted such that, when the lower end of the valve rod 21 comes into contact with the valve seat member 6 (namely, when it reaches the above-described contact position), a bottom surface of the rod conjunction member 221 comes into contact with an inner bottom surface (upper surface of the lower portion) of the inner frame 218 (as represented by a state illustrated in FIG. 1 or 2).

A method of fixing the rod conjunction member 221 is not limited to the above-described one. The rod conjunction member 221 may be divided into two parts and fixed to the valve rod 21 by tightly sandwiching the valve rod 21 between the two parts from front and rear.

The elastic member 224 through which the valve rod 21 and the first fixing member 222 are inserted is disposed between the rod conjunction member 221 and a top surface of the inner frame 218. One end of the elastic member 224 is abutted against the top surface of the inner frame 218, and the other end of the elastic member 224 is abutted against an upper surface of the rod conjunction member 221, thus biasing the valve rod 21 downward via the rod conjunction member 221. A recess having substantially the same diameter as the elastic member 224 is formed in the upper surface of the rod conjunction member 221, and an end portion of the elastic member 224 is fitted to the recess to be supported in a not-displaceable manner. Unlike this embodiment, a recess having substantially the same diameter as the elastic member 224 may be formed in the top surface of the inner frame 218 against which the upper end of the elastic member 224 is abutted. The elastic member 224 in this embodiment is a compression coil spring and has repulsive (compressive) force Pii equivalent to the force that is required to move the valve rod 21, the rod conjunction member 221, the first fixing member 222, and the second fixing member 223.

In the first embodiment, since the first bushing 208, the elastic member 224, the rod conjunction member 221, the second bushing 209, the valve seat member 6, and the nozzle 3 are disposed coaxially with a central axis 225 of the valve rod 21, no moment load is applied to the valve rod 21. Therefore, straight-moving stability of the valve rod 21 is improved, wobbling of the lower end of the valve rod 21 is reduced, and displacement of the contact position of the valve rod 21 with both the valve seat member 6 and the resin film 301 is reduced. In other words, the tip of the valve rod 21 can reliably close the communication hole 7 in the valve seat member 6 and the through-hole 302 in the resin film 301.

Furthermore, the bushings (208, 209) for supporting the valve rod 21 in a linearly movable manner are arranged not only in a central portion of the valve rod 21 (as represented by the second bushing 209), but also in an end portion of the valve rod 21 (as represented by the first bushing 208). That arrangement contributes to further improving the straight-moving stability of the valve rod 21, reducing the wobbling of the lower end of the valve rod 21, and reducing the displacement of the contact position of the valve rod 21 with both the valve seat member 6 and the resin film 301.

In addition, the wobbling of the lower end of the valve rod 21 can be further reduced in some cases by setting a distance from the first bushing 208 to the second bushing 209 substantially equal to a distance from the second bushing 209 to a valve-closed point (i.e., a contact point between the end of the valve rod 21 and the valve seat member 6).

FIG. 3 is an enlarged view of a region A in the discharge device 1 according to the first embodiment of FIG. 1. The resin film 301 will be described in detail below with reference to FIG. 3.

The resin film 301 having a disk-like shape is disposed between the valve seat member 6 and the valve rod 21, and is fixedly held in a state sandwiched between the valve seat member 6 and the inner tube 8 at the lower end of the syringe 2. When components are mechanically fixed as in this embodiment, replacement of consumables, i.e., the valve seat member 6 and the resin film 301, is facilitated.

The through-hole 302 having the same shape from a top view (same diameter in this embodiment) as the communication hole 7 in the valve seat member 6 is formed at a center of the resin film 301. The storage container 2 and the discharge flow path 4 are communicated with each other through the communication hole 7 in the valve seat member 6 and the through-hole 302 in the resin film 301.

A thickness of the resin film 301, i.e., a size of the resin film 301 in a moving direction of the valve rod 21, is set to be relatively thin to cause appropriate deformation of the resin film 301. More specifically, it is disclosed herein that the thickness of the resin film 301 is, for example, 10 to 1,000 μm and preferably 50 to 100 μm. Looking from another aspect, it is disclosed herein that the thickness of the resin film 301 is set to, for example, 1/10 or less and preferably 1/100 or less of a thickness of the valve seat member 6. By setting the thickness of the resin film 301 to be thin, the resin film 301 is easily deformed by pressing force of the valve rod 21, while a deformation amount of the resin film 301 can be suppressed to a smaller value. Easiness in deformation of the resin film 301 is effective in coping with leakage of the liquid material, and a smaller deformation amount is effective in contributing to improvement of the discharge accuracy.

The resin film 301 is preferably made of engineering plastic that is superior in mechanical strength and heat resistance. The engineering plastic is a generic term of plastics having high mechanical strength (e.g., 50 to 200 MPa) and high heat resistance. Examples of the engineering plastic include polyamide (PA), polycarbonate (PC), polyacetal (POM), polybutylene terephthalate (PBT), modified polyphenylene ether (m-PPE), glass-fiber reinforced polyethylene terephthalate (GF-PET), fluorine resin (FR), polyphenylene sulfide (PPS), liquid crystal polymer (LCP), polyarylate (PAR), polysulfone (PSF), polyethersulfone (PES), polyether ether ketone (PEEK), polyimide (PI), polyetherimide (PEI), polyamideimide (PAI), ultrahigh molecular weight polyethylene (UHPE), and syndiotactic polystyrene (SPS). Preferably, any of those examples is selected as appropriate depending on physical properties of the liquid material used and other required properties (such as mechanical strength, heat resistance, and wear resistance). Especially, polyimide is used in this embodiment.

A surface (upper surface) of the resin film 301 coming into contact with the valve rod 21 is flat. On the other hand, the lower end of the valve rod 21 is also flat and has a larger diameter than the through-hole 302 in the resin film 301. Therefore, the lower end of the valve rod 21 comes into plane contact with the resin film 301. The lower end of the valve rod 21 is not necessarily required to be flat (namely, it may be spherical, for example). However, closing performance can be enhanced by bringing the lower end of the valve rod 21 into plane contact with an edge portion of the through-hole 302 instead of bringing the lower end of the valve rod 21 into point contact with the edge portion of the through-hole 302.

The lower end surface of the valve rod 21 is just required to have a size capable of closing the through-hole 302 in the resin film 301. For instance, it is disclosed herein that the lower end surface of the valve rod 21 has a diameter 1.5 to 20 times and preferably 3 to 15 times the diameter of the through-hole 302. By bringing the lower end of the valve rod 21 into a plane contact state, a larger contact region can be obtained with smaller force, and pressing force required for reliable closing can be applied while the deformation amount of the resin film 301 is held small.

With the above-described discharge device 1 according to this embodiment, since the resin film 301 is formed in relatively thin thickness using the engineering plastic superior in mechanical strength and heat resistance and is brought into plane contact with the valve rod 21, satisfactory close contact (closing performance) can be obtained while the deformation amount of the resin film is held small. It is hence possible to prevent leakage of the liquid material from the discharge port in the valve-closed state, and to improve the discharge accuracy. In particular, this embodiment is very effective in preventing leakage of the liquid material from the discharge port when the discharge device 1 is in a vacuum atmosphere.

In the case that the bottom portion of the nozzle attachment member 5 has a sufficient thickness (strength), similar advantageous effects to those described above can also be obtained even when the valve seat is constituted by attaching the resin film 301 to an inner bottom surface of the nozzle attachment member 5 without disposing the valve seat member 6.

<Operations>

Figure 4:
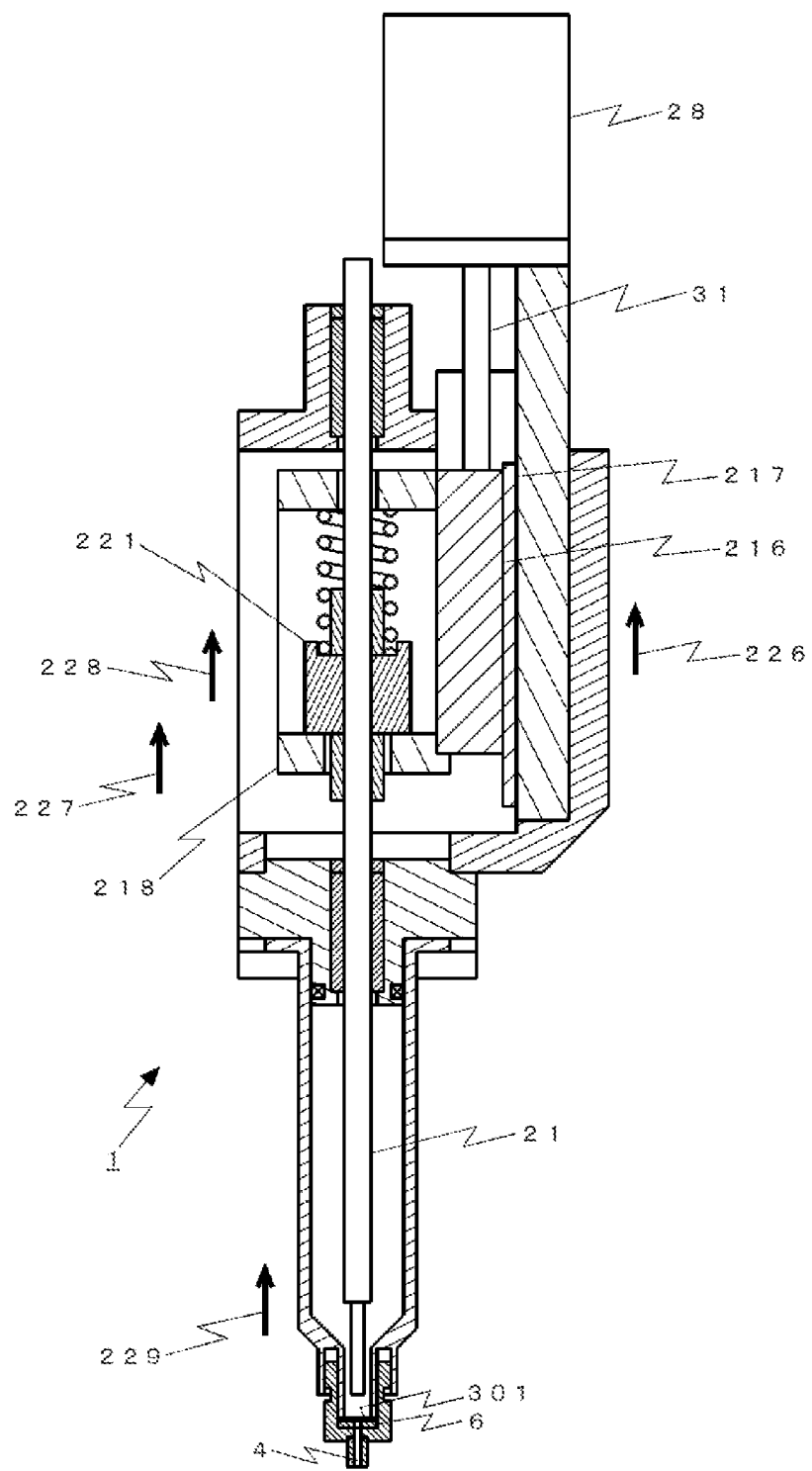
FIG. 4 is an explanatory view referenced to explain an operation of raising a valve rod in the discharge device according to the first embodiment.
Figure 5:
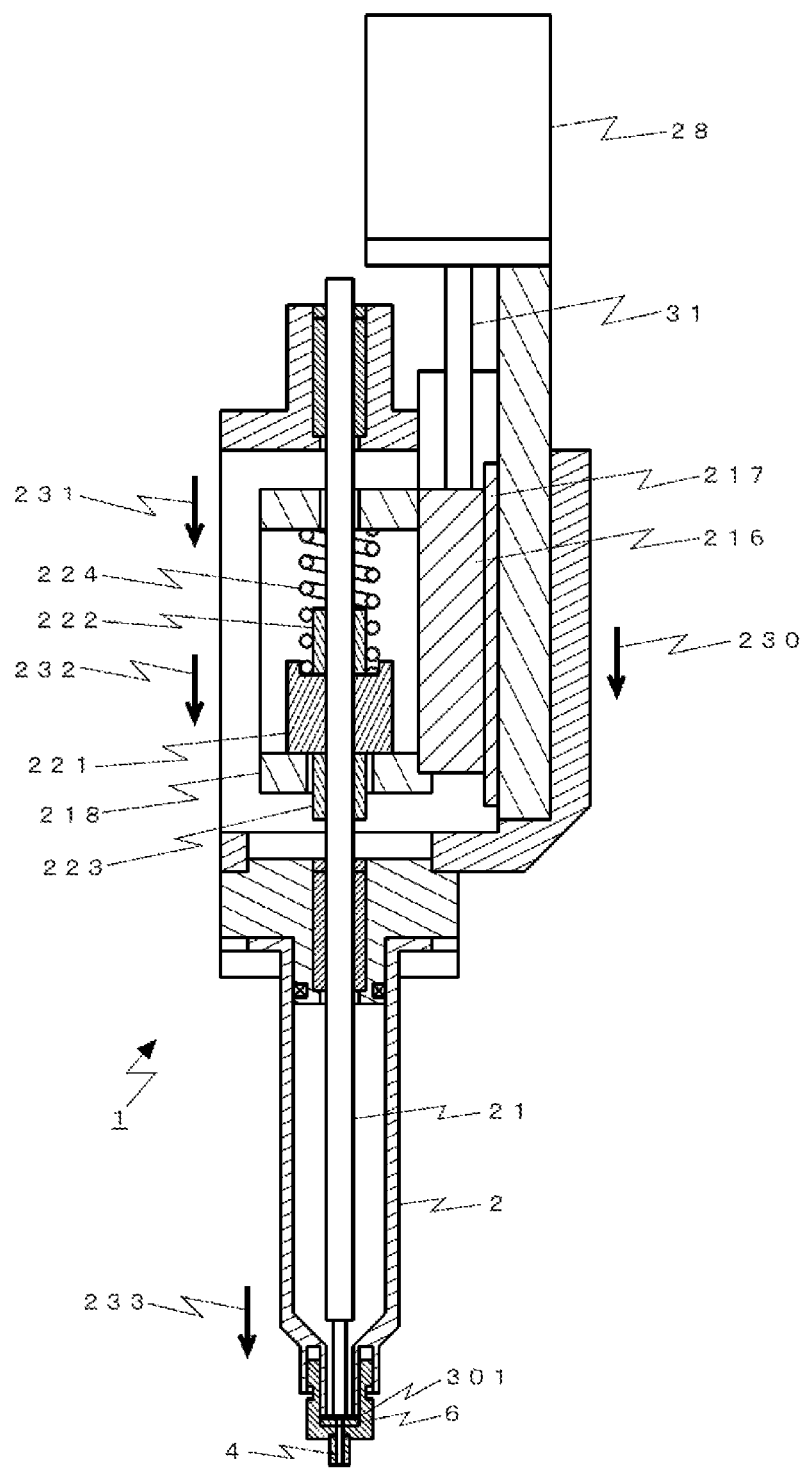
FIG. 5 is an explanatory view referenced to explain an operation of lowering the valve rod in the discharge device according to the first embodiment.
Figure 6:
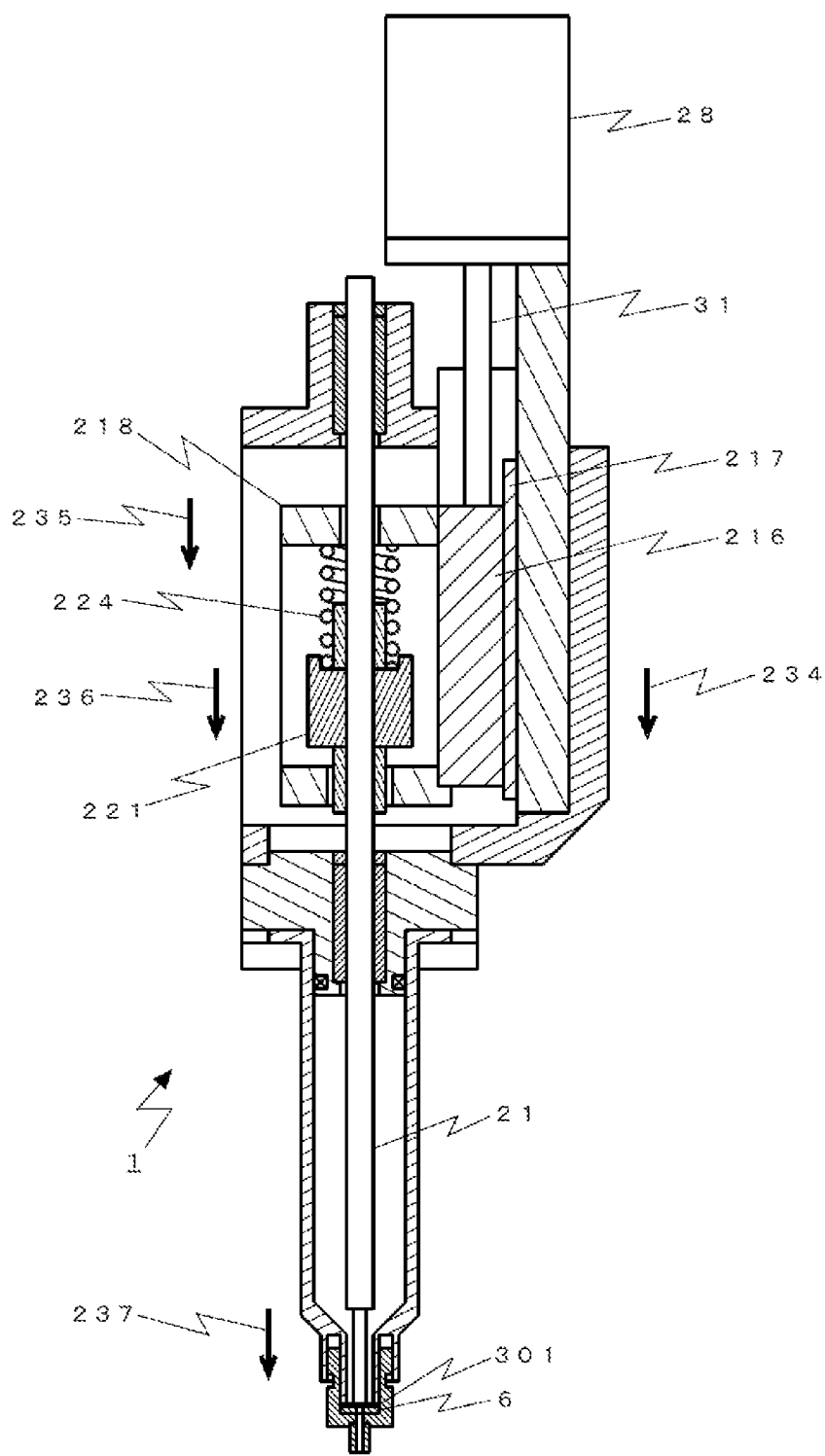
FIG. 6 is an explanatory view referenced to explain an operation of detecting contact of the valve rod in the discharge device according to the first embodiment.

Operations of the discharge device 1 according to the first embodiment of the present invention will be described below with reference to FIGS. 4, 5 and 6.

(Raising Operation)

First, an operation of raising the valve rod 21 from a position where the lower end of the valve rod 21 contacts the resin film 301 is described with reference to FIG. 4. When the actuator 28 is operated to contract the actuator rod 31, the slider 216 connected to the actuator rod 31 rises (as denoted by numeral 226). With rising of the slider 216, the inner frame 218 fixed to the slider 216 rises together (as denoted by numeral 227). With rising of the inner frame 218, the inner bottom surface of the inner frame 218 causes the rod conjunction member 221 to rise together (as denoted by numeral 228), and hence the valve rod 21 held by the rod conjunction member 221 also rises (as denoted by numeral 229). Upon the lower end of the valve rod 21 departing away from the resin film 301, the liquid material having passed through the discharge flow path 4 flows out from the discharge port.

(First Lowering Operation)

An operation of lowering the valve rod 21 until the lower end of the valve rod 21 contacts the valve seat member 6 is now described with reference to FIG. 5. When the actuator 28 is operated to extend the actuator rod 31 downward, the slider 216 lowers (as denoted by numeral 230). With lowering of the slider 216, the inner frame 218 fixed to the slider 216 lowers together (as denoted by numeral 231), thus causing the rod conjunction member 221 to lower via the elastic member 224 (as denoted by numeral 232). On that occasion, since the strength (Pii) of the compression spring constituting the elastic member 224 is set to be equivalent to the force that is required to move the valve rod 21, the rod conjunction member 221, the first fixing member 222, and the second fixing member 223, the spring 224 is substantially not contracted (thus, the bottom surface of the rod conjunction member 221 is kept in contact with the inner bottom surface of the inner frame 218 during the first lowering operation).

With lowering of the rod conjunction member 221, the valve rod 21 also lowers (as denoted by numeral 233), and the lower end of the valve rod 21 comes into contact with the resin film 301. Accordingly, the communication between the discharge flow path 4 and the storage container 2 is cut off, whereby the liquid material is stopped from flowing out from the discharge port.

(Second Lowering Operation)

A lowering operation of bringing the position of the valve rod 21 into a safely closed position is now described with reference to FIG. 6. When the actuator rod 31 continues to extend downward after the lower end of the valve rod 21 has come into contact with the resin film 301, the slider 216 further lowers (as denoted by numeral 234), and the inner frame 218 fixed to the slider 216 also lowers together (as denoted by numeral 235). With lowering of the inner frame 218, a detection plate 45 attached to the inner frame 218 departs away from the sensor 43. Upon detecting such a state, the sensor 43 sends a detection signal to the discharge control device 33. The discharge control device 33 stores, as an initial detected position (or a contact position), a position where the detection plate 45 departs away from the sensor 43.

When the slider 216 lowers in the state that the lower end of the valve rod 21 is in contact with the resin film 301 as described above, the elastic member 224 is contracted and generates repulsive force acting to bias the rod conjunction member 221 downward (as denoted by numeral 236). The biasing force acts to press the valve rod 21 against the resin film 301 (as denoted by numeral 237), thereby bringing the actuator rod 31 into the safely closed position where it is further lowered from the initial detected position by a predetermined distance (e.g., 1 mm). As a result, closing of the resin film 301 by the valve rod 21 is ensured.

While this embodiment is designed so as to further lower the valve rod 21 from the initial detected position where the detection plate 45 departs away from the sensor 43, the position of the detection plate 45 may be adjusted such that the detection plate 45 departs away from the sensor 43 at a position where a spring 42 is extended by a certain length after the lower end of the valve rod 21 has come into contact with the resin film 301 and then has further lowered. The position detection mechanism 34 may also be constituted without using the sensor 43. The contact position of the valve rod 21 may be detected, for example, by detecting a rotation angle or a movement amount of a motor shaft with the aid of an encoder, for example, which is attached to the motor for the actuator 28, and by utilizing an advanced or retracted position of the valve rod 21, which is obtained from the detected rotation angle or movement amount.

<Control of Acceleration Time>

In this embodiment, a drop of liquid pressure caused near the lower end of the valve rod 21 and generation of bubbles due to the drop of liquid pressure are suppressed by controlling a rising speed and an acceleration (acceleration and deceleration times in this embodiment) in the operation of raising the valve rod 21 by the actuator 28.

Figure 7:
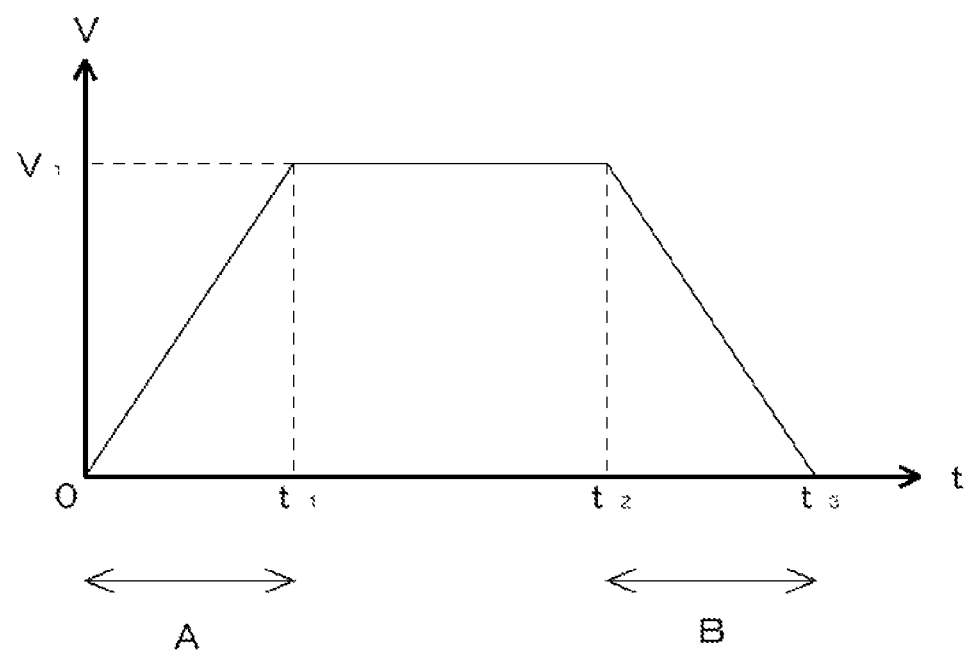
FIG. 7 is a graph (diagram) referenced to explain acceleration and deceleration times when the valve rod is raised.

FIG. 7 is a graph (diagram) referenced to explain acceleration and deceleration times when the valve rod is raised. A vertical axis V represents speed, and a horizontal axis t represents time. When t is zero, the valve rod 21 is at the initial detected position (contact position), and the upward moving speed V is zero. In FIG. 7, A denotes an acceleration time, and B denotes a deceleration time. If a rising-mode acceleration time $A_u$ until reaching a target speed $V_1$ is smaller than a certain value, the problem of bubble generation occurs. As a result of conducting discharge experiments using an underfill material, it has been confirmed that the liquid material can be discharged without generating bubbles under discharge conditions that the target speed $V_1$ is, for example, 0.2 to 30 [mm/s] (preferably 0.5 to 20

[mm/s]) and the rising-mode acceleration time $A_u$ is, for example, 2 to 300 [ms] (preferably 5 to 200 [ms]). In a related-art device, the liquid material is discharged under conditions that the target speed $V_1$ is about 10 times the above-mentioned values and the acceleration time A is about 1/10 time the above-mentioned values.

A rising-mode deceleration time $B_u$ is set to the same value as the rising-mode acceleration time $A_u$, or a value within the allowable range (e.g., 2 to 300 [ms]) of the acceleration time.

A lowering-mode acceleration time $A_d$ and a lowering-mode deceleration time $B_d$ in the operation of lowering the valve rod 21 are set to the same values as the rising-mode acceleration time $A_u$ and the rising-mode deceleration time $B_u$, respectively, or values within the allowable range (e.g., 2 to 300 [ms]) of the acceleration time. The lowering operation as quick as in the related-art device is not preferable because of causing an uncontrollable increase of the discharge amount.

(Discharge Operation)

A liquid material discharge operation including the above raising operation and lowering operation is as follows.

First, the compressed-gas is supplied from a compressed-gas source to the gas supply joint 19 via a compressed-gas supply pipe 20, thus pressurizing the liquid material stored in the syringe 2 via the compressed-gas flow path 18 and a not-illustrated communication hole. When the actuator 28 receives a discharge start signal from the discharge control device 33, the valve rod 21 is raised in accordance with the controlled speed and the controlled acceleration and deceleration times, whereby the liquid material is discharged from the discharge port. After the lapse of a time corresponding to the desired discharge amount, upon receiving a discharge end signal from the discharge control device 33, the actuator 28 lowers the valve rod 21 and closes the through-hole 302 in the resin film 301 (and the communication hole 7 in the valve seat member 6) by the lower end of the valve rod 21 (first lowering operation). The foregoing is one cycle of basic discharge operation. Pressure of the supplied compressed-gas, a rising distance of the valve rod 21, a valve open time, etc. are appropriately set depending on physical properties and states (such as viscosity and temperature) of the liquid material used. The diameter and length of the nozzle 3, the diameters of the communication hole 7 in the valve seat member 6 and the through-hole 302 in the resin film 301, etc. can also be changed depending on conditions.

As described above, in the discharge device 1 according to this embodiment in which the liquid material is discharged by moving the valve rod 21 up and down to open and close the through-hole 302 in the resin film 301 (and the communication hole 7 in the valve seat member 6), which are communicated with the discharge flow path 4 of the nozzle 3 attached to the end of the syringe 2, the generation of bubbles in the inner tube 8 (i.e., in the rod-tip insertion hole) due to a pressure drop, which is caused with rising of the valve rod 21, can be avoided by using the electric actuator 28 capable of adjusting the speed and the acceleration (or the acceleration and deceleration times) in the rising and lowering movements of the valve rod 21, and by appropriately controlling those parameters. As a result, it is possible to solve the problems, for example, that the discharged liquid material is scattered and the drawing lines become disordered due to the presence of the bubbles in the liquid material.

Furthermore, since the discharge device 1 has the structure utilizing the existing syringe and allowing the valve rod 21 to be easily attached and detached, maintenance work, such as cleaning and assembly, is easy to carry out.

Moreover, since the liquid material is fed under pressure using the compressed gas and the opening and closing operations are performed by the valve rod 21, the liquid material can be stably discharged at a high speed (high flow rate) with good response.

With the provision of the position detection mechanism 34, closing of the through-hole 302 in the resin film 301 (and the communication hole 7 in the valve seat member 6) by the lower end of the valve rod 21 can be reliably ensured. Thus, in the first embodiment, since the contact position between the lower end of the valve rod 21 and the resin film 301 is accurately detected by the position detection mechanism 34, the risk of leakage of the liquid material is eliminated even after long-time use.

In addition, since the resin film 301 is disposed between the valve seat member 6 and the valve rod 21, it is possible to prevent leakage of the liquid material from the discharge port in the valve-closed state, and to improve the discharge accuracy.

<Application Device>

Figure 8:
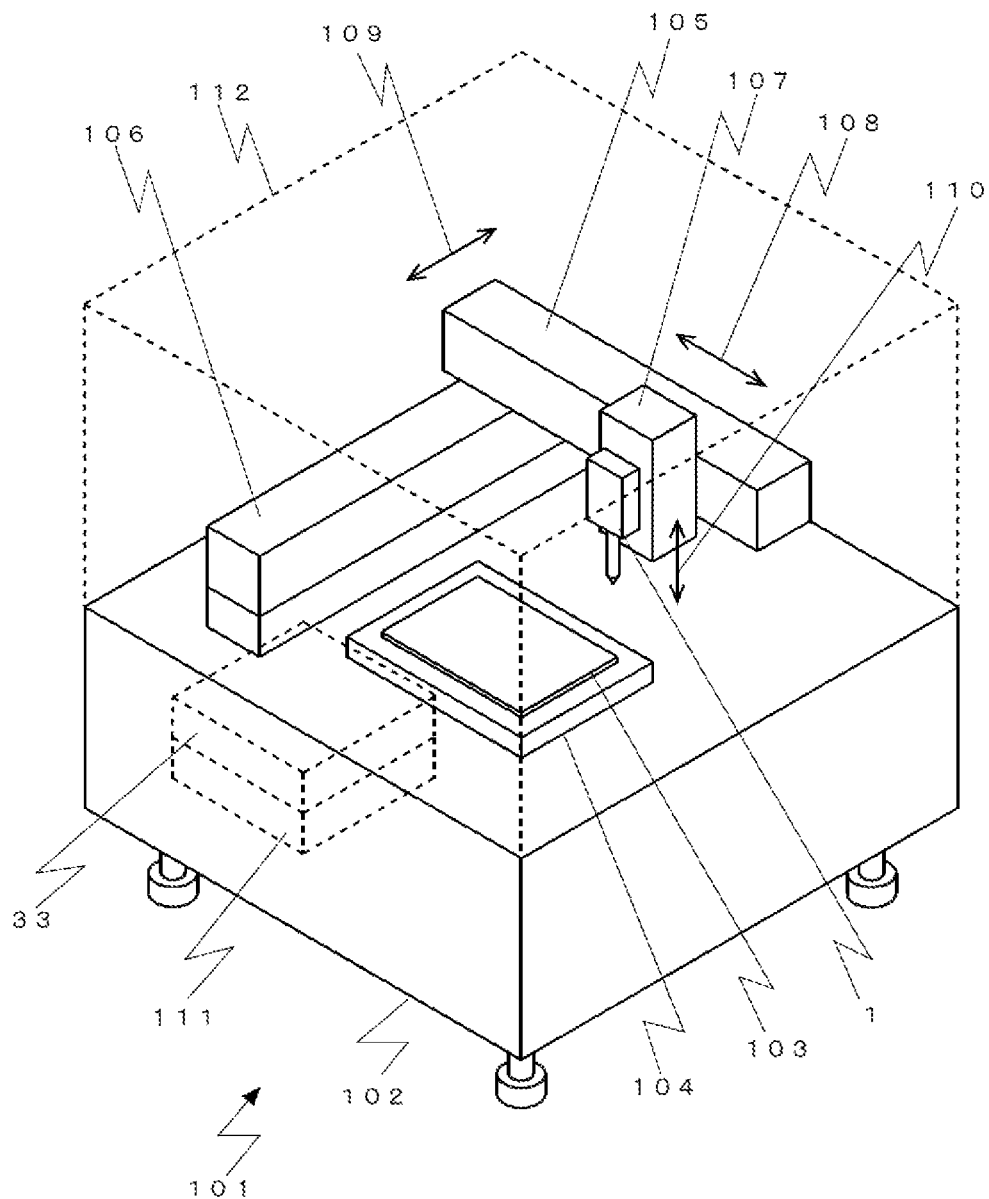
FIG. 8 is a schematic perspective view of an application device according to the first embodiment.

FIG. 8 is a schematic perspective view of an application device 101 including the discharge device 1 according to the first embodiment.

The application device 101 according to the first embodiment includes, on a base 102, a table 104 on which a workpiece 103, i.e., an application target, is to be placed, as well as an X driving device 105, a Y driving device 106, and a Z driving device 107 for moving the above-described discharge device 1 relatively to the workpiece 103. The relative driving devices (105, 106, 107) are movable in directions denoted by numerals 108, 109 and 110, respectively. The discharge control device 33 for controlling the above-described operations of the discharge device 1 and a drive control device 111 for controlling operations of the driving devices (105, 106, 107) are disposed inside the base 102. A space above the base 102 is surrounded by a cover 112 denoted by dotted lines, and an inner space of the cover can be brought into a negative pressure environment using a not-illustrated vacuum pump, for example. The cover 112 may include a door allowing an access to the inner space. Although the inner space is brought into the negative pressure environment in this embodiment, the application work may be performed under atmospheric pressure.

Second Embodiment

Figure 9:
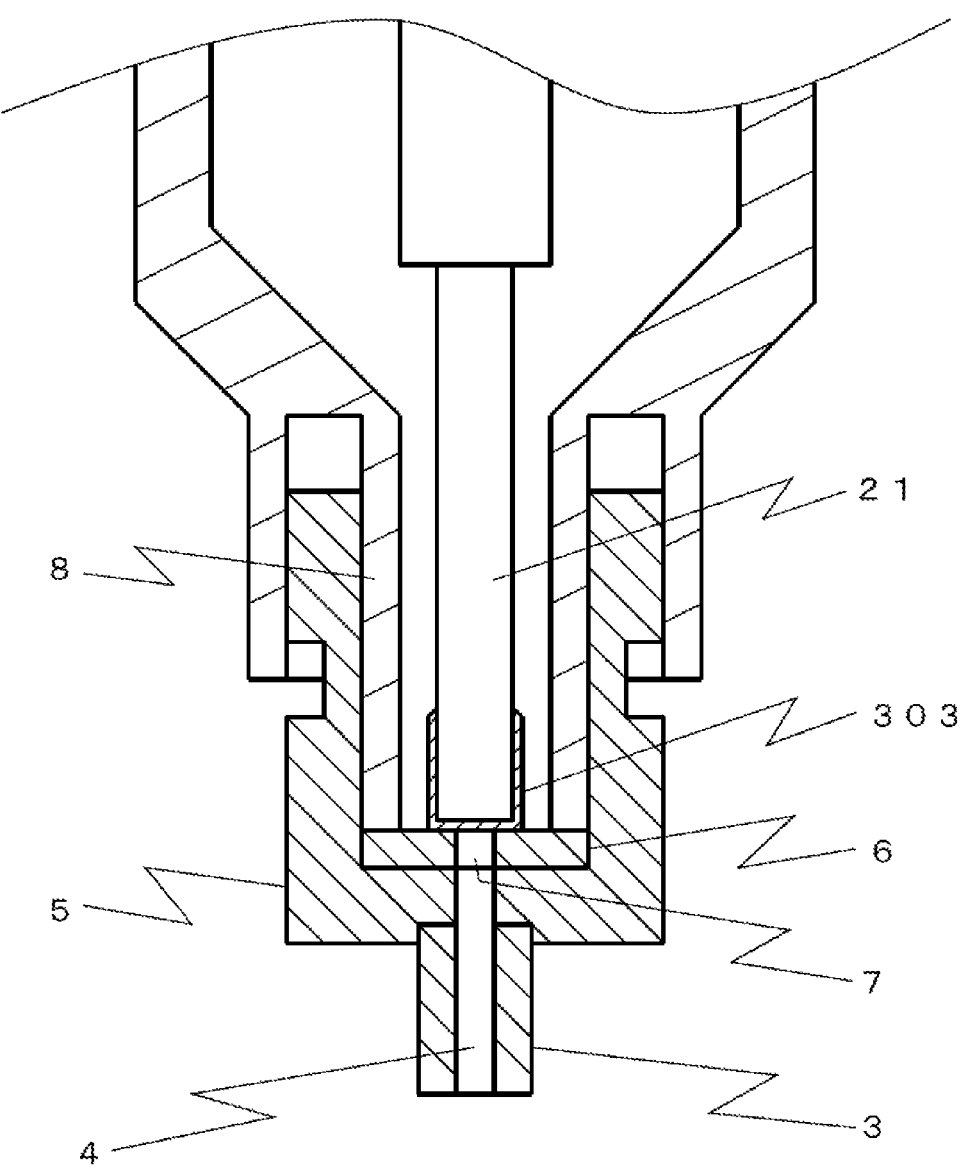
FIG. 9 illustrates, in an enlarged scale, a valve seat member and thereabout in a partial sectional front view of a discharge device according to a second embodiment.

A liquid material discharge device 1 according to a second embodiment, illustrated in FIG. 9, is mainly different from the first embodiment in that a resin film 303 is fixed to the lower end portion of the valve rod 21. In the following, different points from the first embodiment are mainly described, and description of common elements is omitted.

FIG. 9 illustrates, in an enlarged scale, a valve seat member and thereabout in a partial sectional front view of the discharge device according to the second embodiment.

The valve rod 21 in the second embodiment is constituted, as in the first embodiment, such that its lower end portion has a columnar shape with a smaller diameter. The resin film 303 is a cap-shaped or recessed member covering the lower end portion of the valve rod 21, and is mechanically fixed using a not-illustrated fixing member (e.g., an annular member). A projection or a recess engageable with the fixing member may be provided on or in a lateral surface of the valve rod 21.

The resin film 303 in the second embodiment does not have a communication hole unlike the resin film in the first embodiment. The resin film 303 is moved up and down together with the valve rod 21, and is pressed against the valve seat member 6 by the lower end surface of the valve rod 21 upon seating of the valve rod 21 against the valve seat member 6 that constitutes the valve seat. Other points are similar to those in the first embodiment.

In the second embodiment, unlike the first embodiment, the valve seat member 6 and the resin film 303 come into a contact or departed state with the operation of the valve rod 21. However, similar advantageous effects to those in the first embodiment can be obtained with the presence of the resin film 303 positioned between the valve seat member 6 and the resin film 303. In other words, since the resin film 303 is formed in thin thickness using the engineering plastic superior in mechanical strength and heat resistance and is brought into plane contact with the valve rod 21, satisfactory close contact (closing performance) can be obtained while the deformation amount of the resin film is held small. It is hence possible to prevent leakage of the liquid material from the discharge port in the valve-closed state, and to improve the discharge accuracy. The second embodiment is also very effective in preventing leakage of the liquid material from the discharge port when the discharge device 1 is in a vacuum atmosphere.

In the case of the bottom portion of the nozzle attachment member 5 having a sufficient thickness (strength), similar advantageous effects to those described above can also be obtained even when the valve seat is constituted by an inner bottom surface of the nozzle attachment member 5 without disposing the valve seat member 6.

LIST OF REFERENCE SIGNS

1: discharge device, 2: storage container/syringe, 3: nozzle, 4: discharge flow path, 5; nozzle attachment member, 6: valve seat member, 7: communication hole, 8: inner tube (rod-tip insertion hole), 9: flange, 10: body lower member, 11: flange support member, 12: insertion portion, 18: compressed-gas flow path, 19: gas supply joint, 20: compressed-gas supply pipe, 21: valve rod, 28: actuator, 31: actuator rod, 32: control wiring, 33: discharge control device, 34: position detection mechanism, 43: sensor, 44: attachment plate, 45: detection plate, 101: application device, 102: base, 103: application target/workpiece, 104: table, 105: X driving device, 106: Y driving device, 107: Z driving device, 108: X moving direction, 109: Y moving direction, 110: Z moving direction, 111: drive control device, 112: cover, 201: outer frame, 202: fitting hole, 203: opening (lateral surface), 204: extension portion, 205: rear portion, 206: opening (rear surface), 207: projected portion, 208: first bushing, 209: second bushing, 210: first bushing retainer, 211: second bushing retainer, 212: first bushing insertion hole, 213: second bushing insertion hole, 214: sealing member, 215: actuator support member, 216: slider, 217: slide rail, 218: inner frame, 219: first through-hole, 220: second through-hole, 221: rod conjunction member, 222: first fixing member, 223: second fixing member, 224: elastic member, 225: central axis, 226: rising of slider, 227: rising of inner frame, 228: rising of rod holder, 229: rising of valve rod, 230: lowering of slider, 231: lowering of inner frame, 232: lowering of rod holder, 233: lowering of valve rod, 234: lowering of slider, 235: lowering of inner frame, 236: force biasing rod holder downward, 237: force pressing valve rod against resin film, 301: resin film, 302: through-hole (resin film), 303: resin film

The invention claimed is:

1. A liquid material discharge device used in a negative pressure space, the liquid material discharge device comprising:
   a storage container storing a liquid material;
   a compressed-gas supply source pressurizing the storage container;
   a nozzle having a discharge flow path;
   a reciprocating valve rod;
   an actuator driving the valve rod;
   a valve seat having a communication hole that is communicated with the discharge flow path; and
   a discharge control device controlling the actuator to open and close the communication hole by a lower end of the valve rod,
   wherein the liquid material discharge device further comprises a resin film disposed and fixed in a replaceable manner at the lower end of the valve rod or a resin film disposed and fixed in a replaceable manner on an upper surface of the valve seat, the latter resin film having a through-hole that is communicated with the communication hole,
   the valve seat is constituted in a replaceable manner by a valve seat member having a planar upper surface and being fixed to the nozzle in a replaceable manner.

2. The liquid material discharge device according to claim 1, wherein the valve seat member is made of a material not deforming when pressed by the valve rod.

3. The liquid material discharge device according to claim 1, wherein the resin film has a thickness of 10 to 1,000 µm.

4. The liquid material discharge device according to claim 1, wherein the lower end of the valve rod or the upper surface of the valve seat member comes into plane contact with the resin film.

5. The liquid material discharge device according to claim 4, wherein the lower end of the valve rod has a planar surface, and the upper surface of the valve seat member is planar.

6. The liquid material discharge device according to claim 1, wherein the resin film is made of engineering plastic.

7. The liquid material discharge device according to claim 6, wherein the lower end of the valve rod and the valve seat member are each made of metal.

8. The liquid material discharge device according to claim 1, wherein a thickness of the resin film is 1/10 or less of a thickness of the valve seat member.

9. The liquid material discharge device according to claim 8, wherein the nozzle is constituted by a nozzle attachment member having a recess into which a lower end portion of the storage container is fitted, and the resin film is mechanically fixed by the valve seat member attached to the recess of the nozzle attachment member and a tip of the storage container.

10. The liquid material discharge device according to claim 1, wherein the discharge control device is configured to control an acceleration time $A_u$ in rising of the valve rod by the actuator to be held within a range of 2 to 300 [ms].

11. The liquid material discharge device according to claim 10, wherein the discharge control device is configured to control a target speed $V_1$ in the rising of the valve rod by the actuator to be held within a range of 0.2 to 30 [mm/s], and/or controls an acceleration time $A_d$ in lowering of the valve rod by the actuator to be held within a range of 2 to 300 [ms].

12. The liquid material discharge device according to claim 1, wherein the valve rod is connected to the actuator via a slide member, and the liquid material discharge device further comprises a position detection mechanism which includes a sensor mechanism detecting that the slide member is at a predetermined position, and which detects, by detecting a position of the slide member, that the lower end of the valve rod is at a position contacting the valve seat.

13. The liquid material discharge device according to claim 12, further comprising a rod conjunction member connected to the valve rod and arranged in contact with the slide member in a separable manner; and an elastic member wherein, when force acting to further advance the valve rod is applied by the actuator after the valve rod has come into contact with the valve seat, the slide member is moved downward away from the rod conjunction member, and the lower end of the valve rod being at the position contacting the valve seat is detected by detecting the downward movement of the slide member with the sensor mechanism.

14. An application device comprising:

the liquid material discharge device according to claim 1;

a worktable on which a workpiece is to be placed;

a driver moving the liquid material discharge device and the worktable relatively to each other;

a cover constituting a negative pressure space in which the liquid material discharge device, the worktable, and the driver are arranged;

a depressurizer producing negative pressure inside the cover; and a drive control device controlling the driver.

15. The application device according to claim 14, wherein the depressurizer is a vacuum pump.

16. An application method comprising steps of:

providing the application device according to claim 14; and applying the liquid material onto the workpiece while the workpiece and the liquid material discharge device are moved relatively to each other in a state that an inner space of the cover is held under negative pressure by the depressurizer.

17. The application method according to claim 16, wherein the inner space of the cover is substantially under a vacuum.

* * * * *